(No Model.)

M. F. GOODRICH.
VEHICLE.

No. 388,408. Patented Aug. 28, 1888.

Witnesses.
Alexander Brown.
W. E. Van Allen.

Inventor.
Michael Frederick Goodrich
by E. J. Stoddard,
his Attorney

United States Patent Office.

MICHAEL FREDERICK GOODRICH, OF JACKSON, MICHIGAN.

VEHICLE.

SPECIFICATION forming part of Letters Patent No. 388,408, dated August 28, 1888.

Application filed April 21, 1888. Serial No. 271,489. (No model.)

*To all whom it may concern:*

Be it known that I, MICHAEL FREDERICK GOODRICH, of Jackson, in the county of Jackson and State of Michigan, have invented new and useful Improvements in Vehicles, of which the following is a specification.

My invention relates to improvements in vehicles; and the object of my improvements is to provide a vehicle in which the body is hung low to facilitate loading and unloading or getting in and out. I attain this object by the device illustrated in the accompanying drawings, in which—

Figure 1:
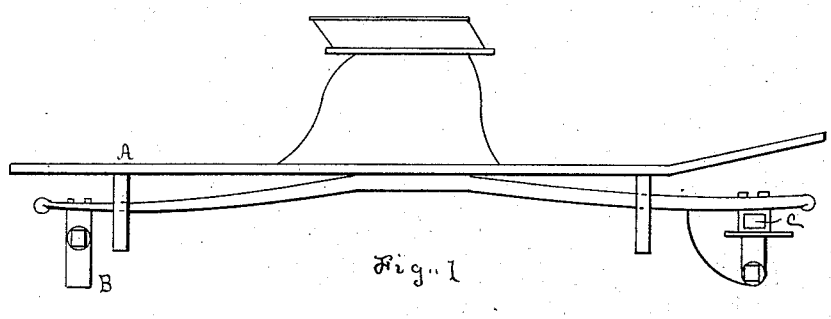
Figure 2:
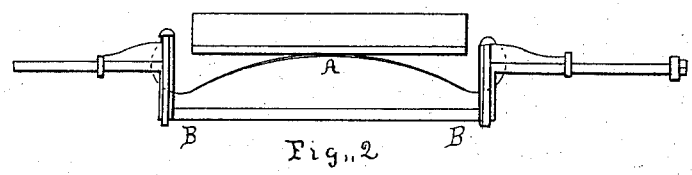

Figure 1 is a side elevation of a vehicle embodying my invention. Fig. 2 is a rear elevation showing the rear axle and body. The wheels are removed.

Similar letters refer to similar parts throughout both the views.

A is the bed of the vehicle having a floor bent upward and extending over the front axle. The bend in the front of the bed leaves a space vertically over said axle, so that the bed may sink upon its spring without coming into contact with said axle.

B is the rear axle. The axle B is bent down near each of its ends, leaving a depression in the axle into which the vehicle-bed may sink when the springs are sufficiently bent.

The front axle, $c$, is of the ordinary construction. The distance between the front axle vertically upward to the bed of the vehicle should be about the same as the distance between the bed of the vehicle vertically downward to the rear axle at its lower portion. By this construction the bed of the vehicle may be hung low, while the bend in the rear axle and the elevation of the front of the body allows the body to sink upon its springs without coming into contact with either of the axles, while the elevation of the floor at the front of the body makes a convenient rest for the feet.

Having fully described my invention, what I claim, and desire to secure by Letters Patent, is—

The combination of a rear axle bent between its ends so as to allow the body of the vehicle to swing below the centers of the rear wheels, a straight forward axle, and a body the floor of which is bent upward at the forward end to leave a space vertically over the forward axle, substantially as shown, and for the purpose described.

MICHAEL FREDERICK GOODRICH.

Witnesses:
JOSIAH B. FROST,
JOHN B. EASTON.